(12) United States Patent
Iturbide Jiménez

(10) Patent No.: US 7,748,723 B2
(45) Date of Patent: Jul. 6, 2010

(54) WHEELBARROW STABILIZER WITH IMPROVED LOAD DISTRIBUTION

(75) Inventor: Salvador Iturbide Jiménez, Atizapan de Zaragoza (MX)

(73) Assignee: Truper Herramientas, S.A. DE C.V. (MX)

( * ) Notice: Subject to any disclaimer, the term of this patent is extended or adjusted under 35 U.S.C. 154(b) by 350 days.

(21) Appl. No.: 11/787,402

(22) Filed: Apr. 16, 2007

(65) Prior Publication Data
US 2008/0246240 A1    Oct. 9, 2008

(51) Int. Cl.
*B62B 1/26* (2006.01)

(52) U.S. Cl. .............. 280/47.31; 280/43.14; 280/43.24; 280/47.131; 280/47.32; 280/47.33

(58) Field of Classification Search ................... 280/40, 280/47.3, 47.31, 47.32, 47.33, 655, 656, 280/767, 43.14, 43.24, 47.131, 7.3, 757; 298/2, 3; 248/300
See application file for complete search history.

(56) References Cited

U.S. PATENT DOCUMENTS

| | | | | |
|---|---|---|---|---|
| 2,253,288 | A | * | 8/1941 | De Lucchi ................. 180/19.1 |
| 2,532,966 | A | * | 12/1950 | Thomas ................... 280/47.33 |
| 2,692,175 | A | * | 10/1954 | Jacques ...................... 108/124 |
| 3,604,753 | A | * | 9/1971 | Couture .......................... 298/3 |
| 4,208,044 | A | * | 6/1980 | Schoenfeld ................... 267/48 |
| 4,431,211 | A | * | 2/1984 | Carrigan ...................... 280/655 |
| 5,465,801 | A | * | 11/1995 | Hoover ....................... 180/19.1 |
| 5,580,018 | A | * | 12/1996 | Remmers ..................... 248/235 |
| D404,881 | S | * | 1/1999 | Shuchart et al. .............. D34/27 |
| D404,882 | S | * | 1/1999 | Shuchart et al. .............. D34/27 |
| D404,883 | S | * | 1/1999 | Shuchart et al. .............. D34/27 |
| D408,607 | S | * | 4/1999 | Shuchart et al. .............. D34/27 |
| D408,955 | S | * | 4/1999 | Shuchart et al. .............. D34/27 |
| D487,833 | S | * | 3/2004 | Parker ......................... D34/27 |
| 6,820,880 | B2 | * | 11/2004 | Benton et al. ............ 280/47.31 |
| D530,879 | S | * | 10/2006 | Iturbide Jimenez et al. .. D34/27 |
| 7,258,231 | B1 | * | 8/2007 | Wertz et al. .................. 206/386 |
| 7,296,807 | B2 | * | 11/2007 | Zimmerman ............. 280/47.32 |

(Continued)

FOREIGN PATENT DOCUMENTS

FR          2620588         *   9/1987

(Continued)

*Primary Examiner*—Lesley Morris
*Assistant Examiner*—Brodie Follman
(74) *Attorney, Agent, or Firm*—Conley Rose, P.C.

(57) ABSTRACT

A device for stabilizing and supporting wheelbarrows which maintains the balance and increases the resistance of a system (wheelbarrow) including an angled monolithic body which is made up of two arms which define a triangular shape, whose ends have holes for the insertion of affixing means to affix to the leg of a wheelbarrow. In one embodiment, one of said arms makes up an arched area along most of its length which generates two points of support, a first point of support defined on the end of the joint affixing with the leg of the wheelbarrow and a second point of support defined in the area near where the two arms meet to define that angle. The arched area of the arm, positioned substantially horizontally and defining the two points of support, absorbs deformation, and also absorbs the load applied to the element, bringing more stability to the wheelbarrow on flat or irregular surfaces, providing a stabilizer comprised by each leg.

12 Claims, 7 Drawing Sheets

U.S. PATENT DOCUMENTS

| | | | |
|---|---|---|---|
| D588,323 S * | 3/2009 | Zimmerman | D34/27 |
| D591,022 S * | 4/2009 | Zimmerman | D34/27 |
| D591,023 S * | 4/2009 | Zimmerman | D34/27 |
| 2008/0265537 A1* | 10/2008 | Lin | 280/47.31 |

FOREIGN PATENT DOCUMENTS

| | | | |
|---|---|---|---|
| GB | 2341160 A | * | 3/2000 |

* cited by examiner

WHEELBARROW STABILIZER WITH IMPROVED LOAD DISTRIBUTION

BACKGROUND OF THE INVENTION

1. Field of the Invention

The present invention relates generally to means and devices used to stabilize and support wheelbarrows and more specifically relates to a wheelbarrow stabilizer with improved load distribution which serves to maintain balance and improve the resistance of a system for a wheelbarrow.

2. Background Art

Nowadays many different stabilizing and supporting elements exist which help maintain the balance and/or improve resistance in wheelbarrows, the elements vary in geometry as well as in various types of materials which go from metal bars and pipes to preformed profiles.

Stabilizers are mainly placed as reinforcements in lateral supports (legs): they are usually totally straight in the lower section, which rests on the ground.

The supports and stabilizers found in the market work best on flat surfaces, and with time lose their basic geometry, upon supporting repeated, alternating and fluctuating loads and due to work on uneven surfaces.

Up to now no practical, simple, functional wheelbarrow stabilizer known compares to the state of the art stabilizers and supports which have a shock absorber section that avoids permanent deforming of the element.

SUMMARY OF THE INVENTION

The present invention has as its main objective to make available a wheelbarrow stabilizer which allows for improved load distribution with better stability under loaded conditions.

Another objective of the invention is to make available a wheelbarrow stabilizer with improved load distribution, which supports repeated, alternating and fluctuating loads without losing its basic geometry.

Another objective of the invention is to make available a wheelbarrow stabilizer with improved load distribution, which improves stability on uneven ground.

Another objective of the invention is to make available a wheelbarrow stabilizer with improved load distribution, which at the same time reinforces the lateral support (leg).

Another objective of the invention is to provide the wheelbarrow stabilizer with improved load distribution which works under shock absorbing conditions in order to avoid permanent deformation of the element.

Another objective of the invention is to make available a wheelbarrow stabilizer with improved load distribution in one piece, which avoids the use of a large number of components and which facilitates installation.

Another objective of the invention is to make available a wheelbarrow stabilizer with improved load distribution which also has an ergonomic shape for fitting to the legs of the wheelbarrow.

Another objective of the invention is to provide the wheelbarrow stabilizer with improved load distribution, which also is highly practical, resistant and functional.

An objective of the invention is to make available the wheelbarrow stabilizer with improved load distribution which is also economical to manufacture and buy, since no specialized equipment is used in its manufacturing.

And all of those qualities and objectives which will become apparent through the general and detailed descriptions of the present invention, supported by the illustrations.

Generally, the wheelbarrow stabilizer with improved load distribution according to the present invention consists of a monolithic angled piece which is made up of two arms which define a triangular shape, whose ends consist of screw holes for the insertion of affixing means to attach to the leg of the wheelbarrow.

One of the arms, the one that will rest on the ground is placed substantially horizontally; the arm consists of an arched area in almost all its longitudinal section which has supporting points which are supported on the ground and whose end is affixed to the lower part of the leg of the wheelbarrow. The other arm is straight and is placed at a slant in order to be affixed to the upper part of the leg of the wheelbarrow, thus acting as a support.

The arch shaped arm, define two supporting points, the first supporting point being defined at the end of the joint union with the leg of the wheelbarrow and the second supporting point being defined in the area near where the two arms join to define the angle.

The stabilizing configuration provides the wheelbarrow with more stability under loaded conditions when the wheelbarrow is static on the ground.

The arched area, which is positioned substantially horizontally and which defines the two supporting points, absorbs deformations, and also cushions the load applied to the element, giving the wheelbarrow greater stability on flat as well as irregular surfaces, reinforcing the legs, making a stabilizer for each leg necessary.

In the preferred version, the stabilizer is manufactured from material which is resistant, but at the same time resilient, so that the resiliency allows the stabilizers to act as shock absorbing elements, a kind of spring, which avoids permanent deforming of the element; but which also allows for repeated, alternating and fluctuating loads without losing the basic geometry. Thus, the stabilizer preferably is made of fluted sections of steel.

Preferably the stabilizer is manufactured of a strip of shaped steel, extruded and perforated on the ends: for connecting it has square holes.

Holes are disposed in the connecting ends, preferably having a square shape in order to facilitate assembling and to hide the head of the screw. These holes having such a shape also do not allow the screw to rotate on their axis while being assembled and this allows for a better union between the leg of the wheelbarrow, the stabilizer and the screw.

In order to better understand the characteristics of the invention, it is accompanied by, as an integral part of the document, the drawings, of an illustrative and non-limiting character, which are now described.

BRIEF DESCRIPTION OF THE DRAWING FIGURES

In order to better understand the invention, a detailed description of some of the embodiments of the invention shall be made, and shown in the illustrations which are attached to the present description, with purely illustrative, non-limiting ends.

DETAILED DESCRIPTION OF THE PREFERRED EMBODIMENTS

The details which characterize the wheelbarrow stabilizer with improved load distribution are clearly shown in the following description and the illustrative drawings which accompany it, the same reference signs designating the same parts.

Figure 1:
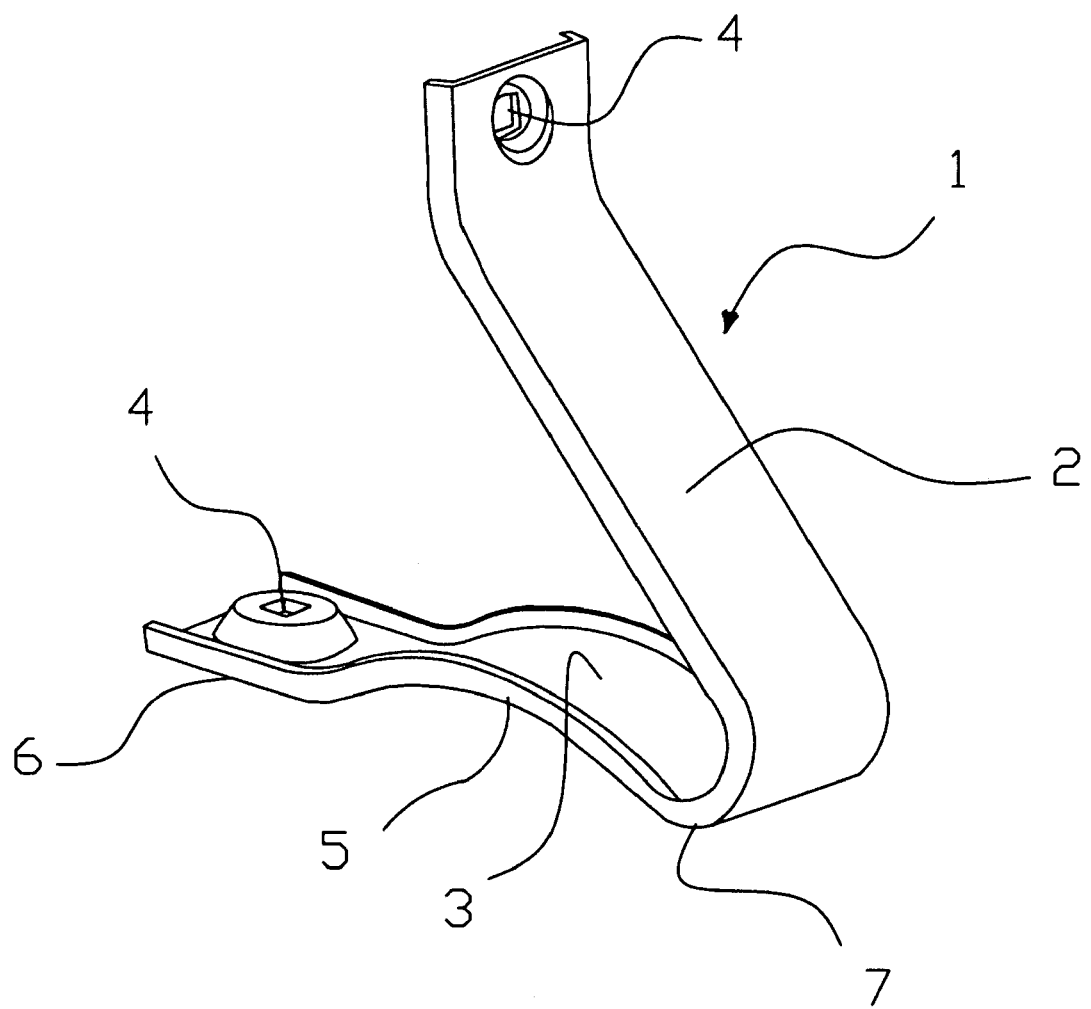
FIG. 1 shows a conventional perspective of a wheelbarrow stabilizer with improved load distribution of the present invention.
Figure 2:
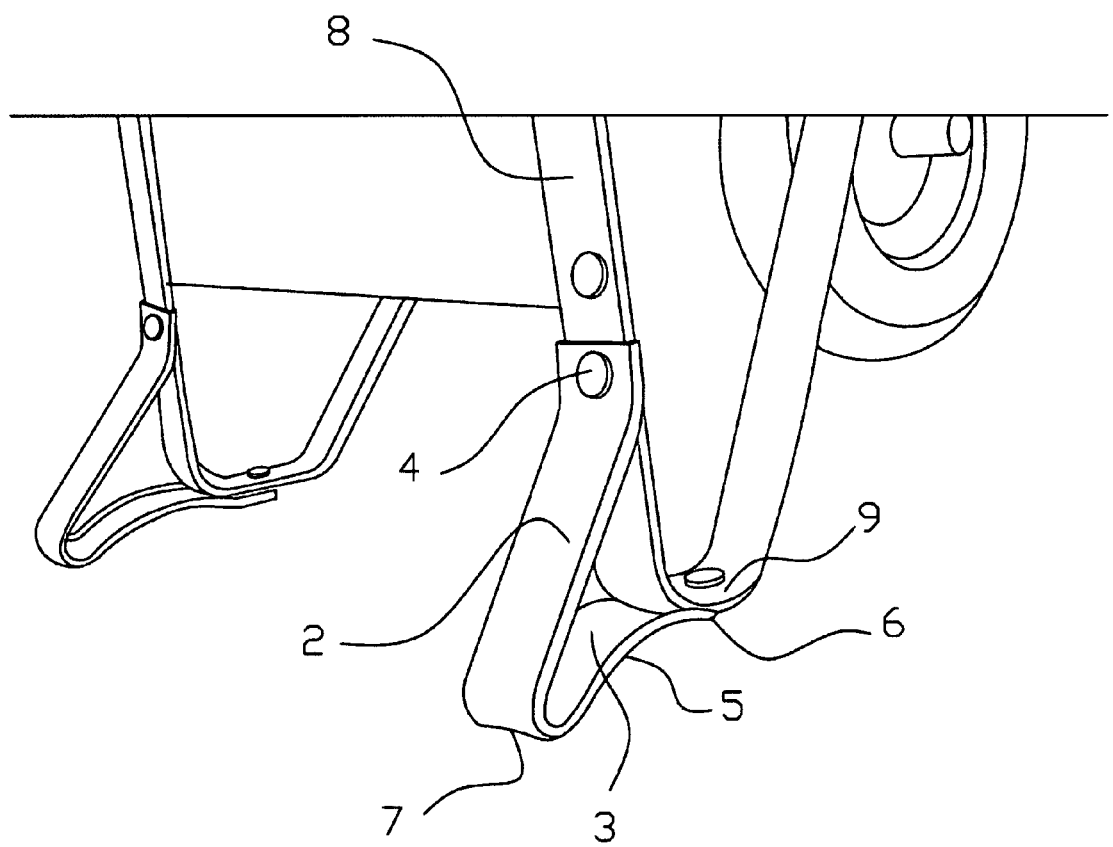
FIG. 2 shows a conventional perspective view of the wheelbarrow stabilizer with improved load distribution of the present invention, joined to the legs of a wheelbarrow.

FIGS. 1 and 2 show, in a conventional perspective view, a wheelbarrow stabilizer with improved load distribution of the present invention and a conventional view of a portion of a wheelbarrow with the stabilizers of the present invention installed, respectively. In the figures, it can be observed that the stabilizer consists of a monolithic piece 1 comprising two arms 2, 3 which form a triangular configuration. Both arms 2 and 3 at the ends have holes 4, preferably square in shape in order to facilitate the insertion of affixing means (not shown) in order to affix to the legs of a wheelbarrow and hide the affixing means. The holes 4 in this shape also make it impossible for the affixing means to rotate on their axis during assembly and at the same time allow for a better union between the leg of the wheelbarrow, the stabilizer and the affixing means. Arm 2, in its preferred version, is straight and is placed at a slant or an angle to enable attachment to the upper part of leg 8 of the wheelbarrow. Arm 3 which is disposed in a substantially horizontal position further comprises an arched area 5 extending substantially along all its length which forms two supporting points 6 and 7 on the ground, a first supporting point 6 defined at the end where the union is found for affixing with the flat supporting surface 9 and leg 8 of the wheelbarrow and a second supporting point 7 defined in the area near where the two arms which form an angle meet.

Figure 3:
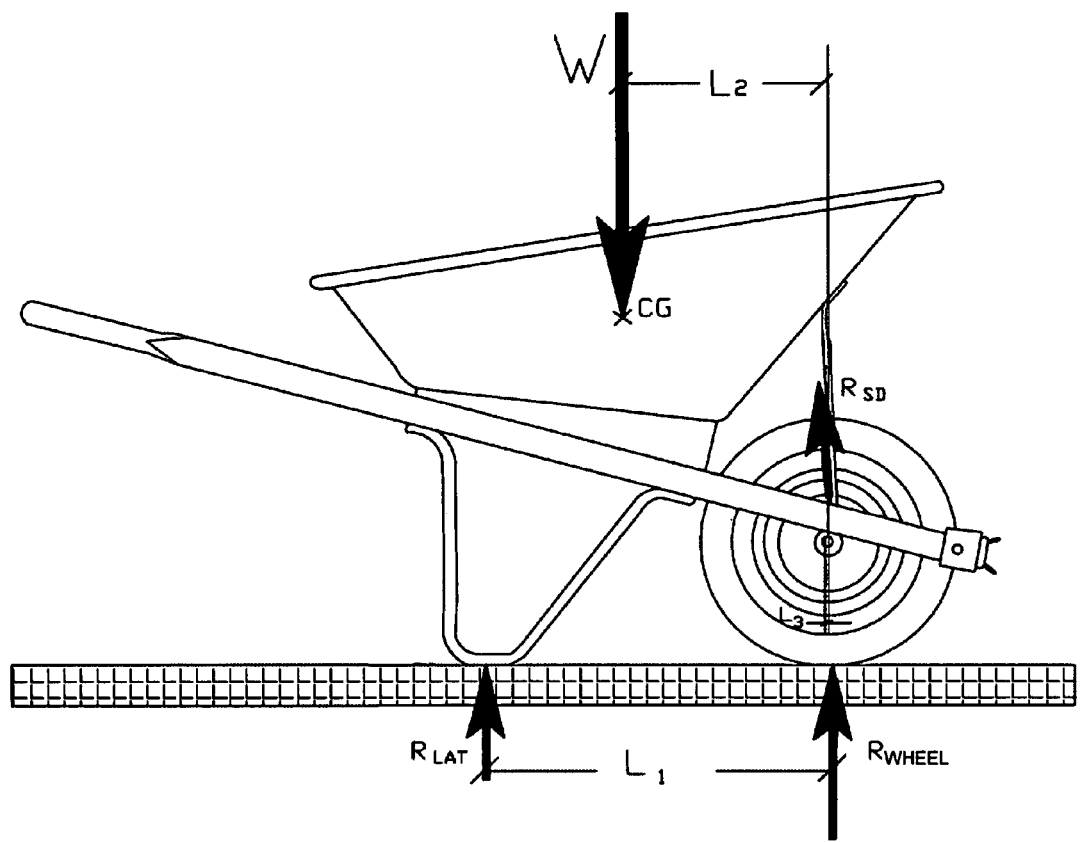
FIG. 3 shows a side view of a wheelbarrow without the state of the art stabilizer, showing the forces which act due to the weight.

Referring to FIG. 3, which shows a lateral view of a wheelbarrow without the state of the art stabilizers, the forces which act due to the action of the weight are shown. In the figure, the reactions of the forces which are exerted on the "wheelbarrow system" without stabilizers is shown. For this demonstration the point of gravity CG was taken as the middle point of the container on which there is also exerted the load of system W. The force of reaction of the axis of the wheel towards the container of the wheelbarrow was designated $R_{SD}$, the force of reaction of the supporting point of the wheel on the ground was designated $R_{wheel}$, the force of the reaction of the leg of the wheelbarrow was designates $R_{LAT}$, and the distance from CG to the axis of the wheel was designated $L_2$ and the distance which made up the force of the reaction of the leg of the wheelbarrow to the supporting point of the wheel on the ground was designated $L_1$, the distance from the supporting point of the wheel on the ground to the axis of the wheel was designated $L_3$, as shown in the following analysis of the system loads of the wheelbarrow without a stabilizer:

The following values concentrated in Table 1 were used for calculating reaction forces:

| LITERAL | NUMERICAL VALUE (mm) |
|---|---|
| $L_1$ | 510 |
| $L_2$ | 322 |
| $L_3$ | 8 |
| $L'_1$ | 620 |
| $L_a$ | 83 |
| $L_b$ | 40.7 |
| a | 51 |
| b | 6 |
| e | 2.9 |
| r | 81 |
| W | 250 |

$$R_{SD} = \frac{w}{2}\left[\frac{L_1 - L_2}{L_1 + L_3}\right] \quad (1)$$

$$R_{SD} = 0.181W$$

$$R_{LAT} = \frac{W}{2}\left[1 - \frac{L_1 - L_2}{L_1 + L_3}\right] \quad (2)$$

$$R_{LAT} = 0.318W$$

$$R_{wheel} = W\left(\frac{L_1 - L_2}{L_1 + L_3}\right) \quad (3)$$

$$R_{wheel} = 0.362W$$

The system (wheelbarrow without stabilizer generates destabilization by displacing the $X_0$ distance (measured from the center of the wheel)

$$+\uparrow\sum M_A = 0$$

$$\frac{W}{2}X_0 = R_{Lat}L_1$$

$$X_0 = \frac{2R_{Lat}L_1}{W} \quad (1)$$

where $X_0$ is the distance in which the system maintains balance. As the value of this distance increases, the system will suffer destabilization.

With the aid of FIG. 4, once again the value for $X_0$ is obtained, but placing $R_{LAT}$ at the end of the stabilizer.

Figure 4:
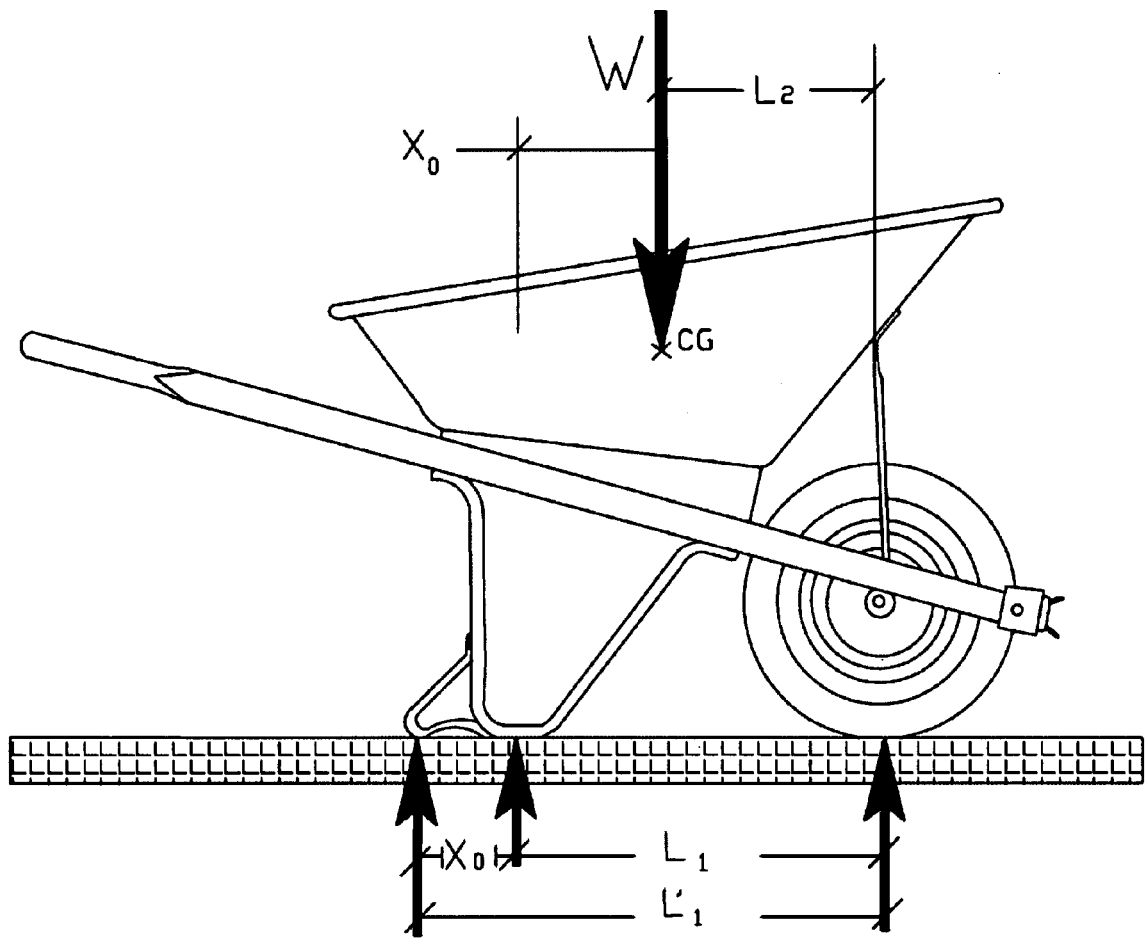
FIG. 4 shows a side view of a wheelbarrow with the wheelbarrow stabilizer with improved load distribution installed on the legs, according to the present invention, showing the forces which act due to the weight.

The new distance will now be $L'_1$ (see FIG. 4)

$$X_0 = \frac{2R_{Lat}L'_1}{W}$$

The difference between $L_1$ and $L'_1$ is the distance in which the load could be displaced without losing stability in the system. That is to say, the placing of the new support element provides a significant factor in increasing the stability of the load.

With reference to FIG. 4, which shows a side view of a wheelbarrow with stabilizers with improved load distribution installed in the legs, according to the present invention, the forces which act due to the action of weight are observed. In the figure, the equation which describes the trajectory of the stabilizer, beginning with the equation of the circumference, with the center in the origin, the equation of the stabilizing curve is obtained:

$$|X^2+Y^2|=r^2$$

$$Y^2=r^2-X^2$$

$$Y=(r^2-X^2)^{1/2}$$

$$Y=(r^2-X^2)^{1/2}$$

$$Y=\sqrt{(r^2-X^2)}$$

$$Y=\sqrt{(6561-X^2)}$$

Figure 5:
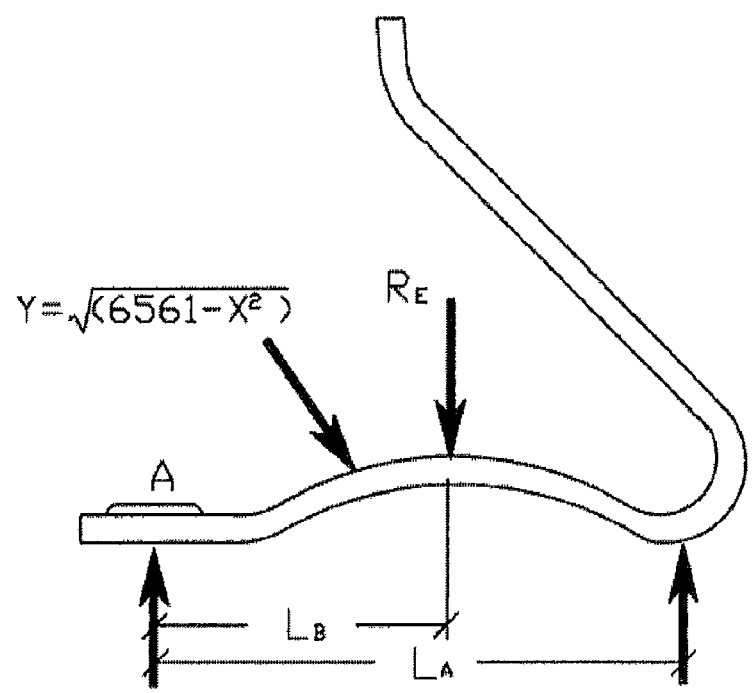
FIG. 5 shows a side view of a wheelbarrow stabilizer with improved load distribution of the present invention, illustrating the forces which act due to the action of weight and the reaction of the stabilizer.
Figure 6:
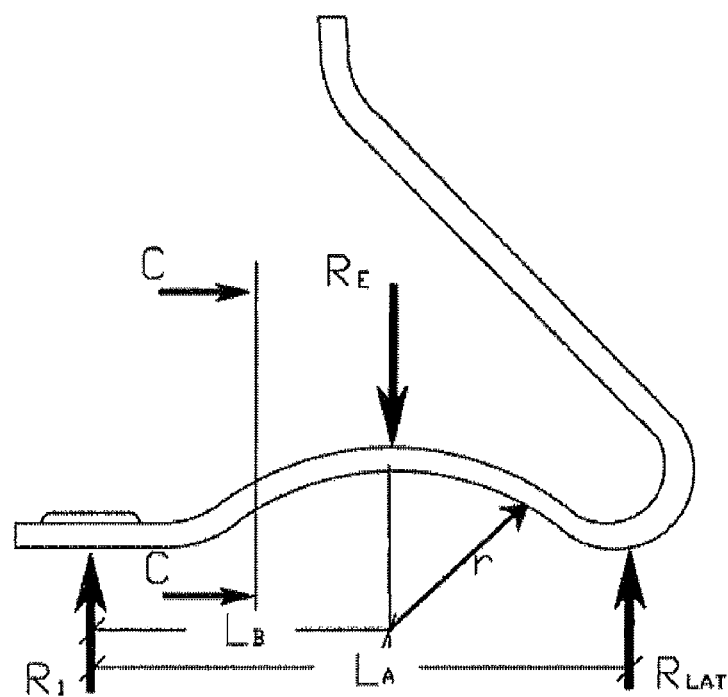
FIG. 6 shows a side view of a wheelbarrow stabilizer with improved load distribution of the present invention, showing the forces which act due to the action of weight, the reaction of the stabilizer and deflection.

Making reference to FIGS. 4 and 5, based on the figures, the following formulas of the reaction of the stabilizer $R_E$ and the reaction on the lateral support (see FIG. 4) $R_1$ were obtained:

$$\uparrow \sum Fy = 0$$

$$R_{Lat} + R_1 = R_E \quad (1)$$

$$+\uparrow \sum MA = 0$$

$$R_E L_B = R_{Lat} L_A$$

If:

$$R_{Lat} = \frac{W}{2}\left[1-\left(\frac{L_1-L_2}{L_1+L_3}\right)\right]$$

$$R_E = \frac{W}{2}\left[1-\left(\frac{L_1-L_2}{L_1+L_3}\right)\right]\left(\frac{L_A}{L_B}\right)$$

$$R_1 = \left[\frac{W}{2}\left[1-\left(\frac{L_1-L_2}{L_1+L_3}\right)\right]\right]\left[\frac{L_A}{L_B}-1\right]$$

Based on FIGS. 6 to 9, the maximum deflection which takes place with load RE in the center was determined, for which the following formula is used:

$$Y_{Max} = \frac{R_E(L_A)^2}{48EI}$$

Figure 7:
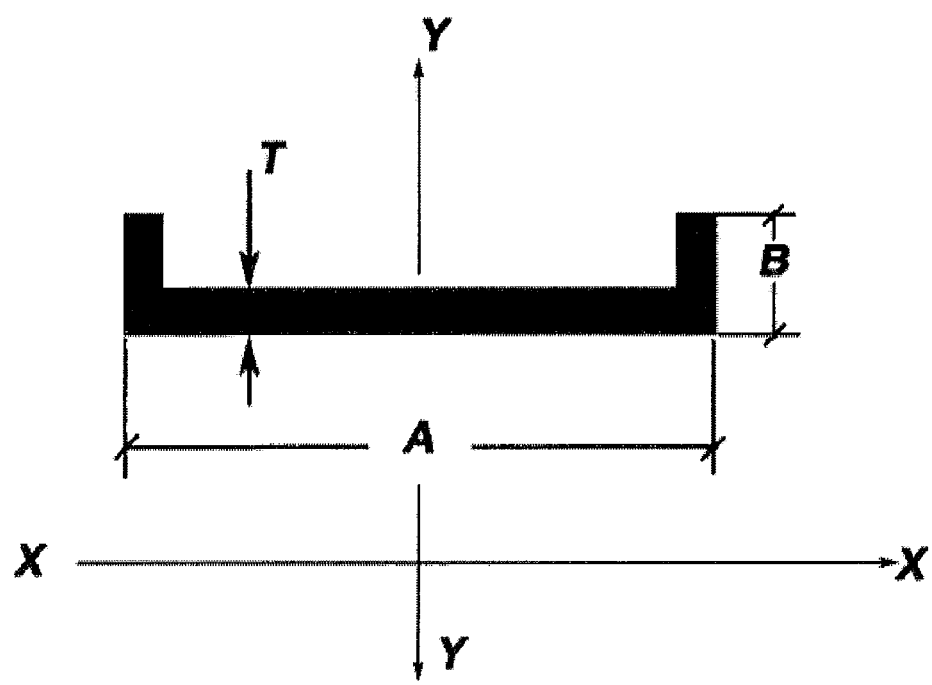
FIG. 7 shows a cross section view on the c-c line shown in FIG. 6, showing the centroid of the stabilizer.

And where the centroid of the section of the stabilizer is cut c-c, which is shown in FIG. 7, and which is obtained using the formula with respect to y-y:

$$\bar{Y} = \frac{\sum Ay}{\sum A}$$

Figure 8:
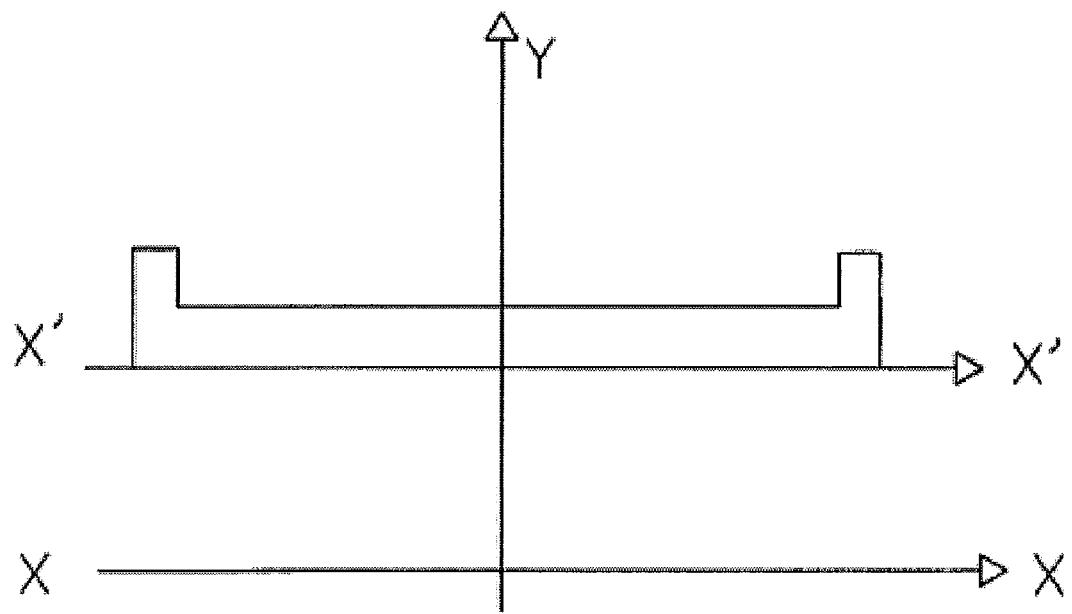
FIG. 8 shows a cross section on the c-c line of FIG. 6, showing the centroid of the wheelbarrow stabilizer with improved load distribution; where the theorem of parallel axis is applied to the stabilizer of the invention in order to determine the moment of inertia.
Figure 9:
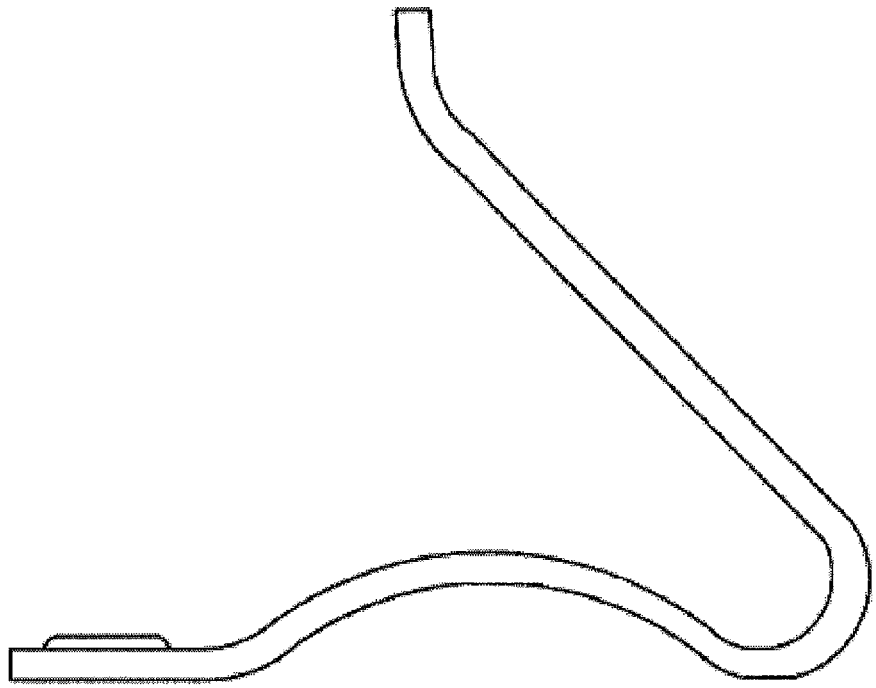
FIG. 9 shows a side view of the stabilizer of the present invention, showing the length L between the supporting point and the maximum height of the curved section of the stabilizer, at the moment of maximum deflection.

In relationship to axis X'-X' and in relationship to axis X-X, applying the theorem of parallel axis, as in FIGS. 8 and 9

$$I_X = \bar{I} + Ad^2$$

$$\bar{I}_{XX} = I_X + Ad^2$$

Referring to FIG. 9 which shows a conventional perspective of the moment of maximum deflection of the stabilizer of the present invention, as can be seen, the arc caused in the stabilizer increases notably at the moment of inertia and as a result so does its resistance and the deforming of the same diminishes upon obtaining a value for the moment of inertia with the stabilizer in the curved area $I_{XX}$=45,795.5 mm4 as opposed to that obtained for the wheelbarrow without stabilizers $I_X$=245.44 mm4. Thus, the configuration of the stabilizer with a curved section which defines the two points of support provides greater stability to the wheelbarrow under loaded conditions in a state where the wheelbarrow is static on the ground; it absorbs deformations, also cushioning the load applied to the element, providing the wheelbarrow greater stability on flat and irregular surfaces, reinforcing the legs, making it necessary to have a stabilizer on each leg.

The invention has been sufficiently described so that someone with ordinary skill in the field may reproduce and obtain the results we mention in the present invention. However, any person having ordinary skill in the state of the art of the present invention may make modifications not described in the present application. However, if for the application of these modifications of a determined structure or for the process of manufacturing the same, the material claimed in the following claims is required, the structures shall be considered within the scope of the invention. The description of the preferred embodiments made above is for illustration of the preferred embodiments, and is not to be considered limiting the scope of the invention, which is defined and limited only by the following claims and their equivalents.

What is claimed is:

1. Wheelbarrow stabilizer with improved load distribution for a wheelbarrow having a leg with upper and lower sides and for wheeling loads over ground, comprising:
    an angled monolithic body having base and support arms which define a triangular shape with the wheelbarrow leg;
    the base arm being substantially horizontal with the ground and having first and second points of contact with the ground, the base arm having an arched portion with a parabolic shape extending between the first and second points of contact, the base arm having an end affixed on the lower side of the leg of the wheelbarrow;
    the support arm being straight and placed on a slant to affix to the upper part of the leg of the wheelbarrow, the support arm serving as support; and
    the arched portion providing resiliency with the parabolic shape of the arched portion deforming with the load and returning to the parabolic shape without the load.

2. The wheelbarrow stabilizer with improved load distribution of claim 1, said two points of support of the arm further comprising a first point of support defined on the end of the joint union with the leg of the wheelbarrow and a second point of support defined on the area near where the two arms join to define the angle.

3. The wheelbarrow stabilizer with improved load distribution of claim 1, wherein the end of the base arm and an end of the support arm have holes for the insertion of affixing means to affix to the leg of the wheelbarrow.

4. The wheelbarrow stabilizer with improved load distribution of claim 2, wherein the end of the base arm and an end of the support arm have holes for the insertion of affixing means to affix to the leg of the wheelbarrow.

5. The wheelbarrow stabilizer with improved load distribution of claim 1, wherein the stabilizer is manufactured of a resistant and resilient material to provide a shock absorbing element that avoids permanent deformation, allowing support for repeated, alternating and fluctuating loads without losing its basic geometry.

6. The wheelbarrow stabilizer with improved load distribution of claim 5, wherein said material comprises a strip of steel extracted from a fluted section.

7. The wheelbarrow stabilizer with improved load distribution of claim 3, wherein said holes comprise a square shape in order to facilitate assembly and hide the affixing means, avoiding rotation on the axis of the affixing means during assembly.

8. The wheelbarrow stabilizer with improved load distribution of claim 3, wherein the stabilizer is manufactured of a resistant and resilient material to provide a shock absorbing element that avoids deforming, allowing support for repeated, alternating and fluctuating loads without losing its basic geometry.

9. The wheelbarrow stabilizer with improved load distribution of claim 8, wherein said material comprises a strip of steel extracted from a fluted section.

10. The wheelbarrow stabilizer with improved load distribution of claim 4, wherein said holes comprise a square shape in order to facilitate assembly and hide the affixing means, avoiding rotation on the axis of the affixing means during assembly.

11. A stabilizer for use with a wheelbarrow having a leg with upper and lower sides for improved load distribution while wheeling loads over ground, the stabilizer comprising:
   a monolithic stabilizer body having first and second arms which are angled relative to each other;
   the first arm of said stabilizer body extending substantially horizontally with the ground when the stabilizer is attached to a wheelbarrow and the wheelbarrow is in a normal standing position, the first arm including two points of support with the ground and including an arched area along a substantial portion of its length extending between the two points of support on the ground, at least one end of the first arm being attached on the lower side to one leg of the wheelbarrow; and
   the second arm being straight and disposed at an angle to provide an attachment point to the upper part of the leg of the wheelbarrow;
   wherein the arched area has a parabolic shape, a cross-sectional area and a moment of inertia, the moment of inertia of the arched area being greater than that of a linear arm extending between the two points of support and having the same cross-sectional area, the greater moment of inertia causing the first arm to have a greater resistance to deformation than a linear arm.

12. A wheelbarrow for wheeling loads over ground, comprising:
   a body with two legs having upper and lower sides; and
   a stabilizer for each leg to provide load distribution to the wheelbarrow,
   each stabilizer comprising a monolithic stabilizer body having first and second arms which are angled relative to each other;
   the first arm of said stabilizer body extending substantially horizontally with the ground when the stabilizer is attached to the wheelbarrow and the wheelbarrow is in a normal standing position, the first arm including an arched area along a substantial portion of its length and two points of support on the ground, at least one end of the first arm being attached on the lower side to one leg of the wheelbarrow; and
   the second arm being straight and disposed at an angle to provide an attachment point to the upper part of the leg of the wheelbarrow;
   wherein the arched area absorbs deformations caused by the loads and cushions the loads as applied to the wheelbarrow body.

\* \* \* \* \*